June 19, 1951  W. S. PRAEG  2,557,462
GEAR FINISHING
Filed Feb. 18, 1946  2 Sheets-Sheet 1

INVENTOR.
WALTER S. PRAEG
BY
ATTORNEYS

June 19, 1951 W. S. PRAEG 2,557,462
GEAR FINISHING
Filed Feb. 18, 1946 2 Sheets-Sheet 2
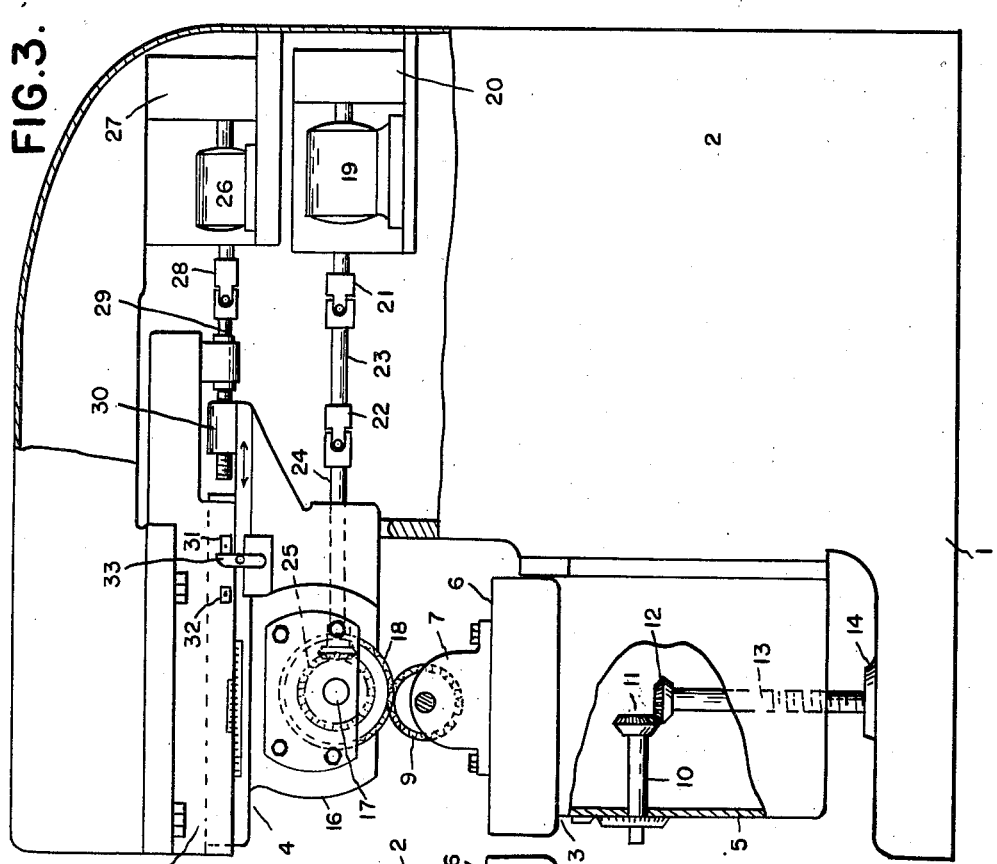
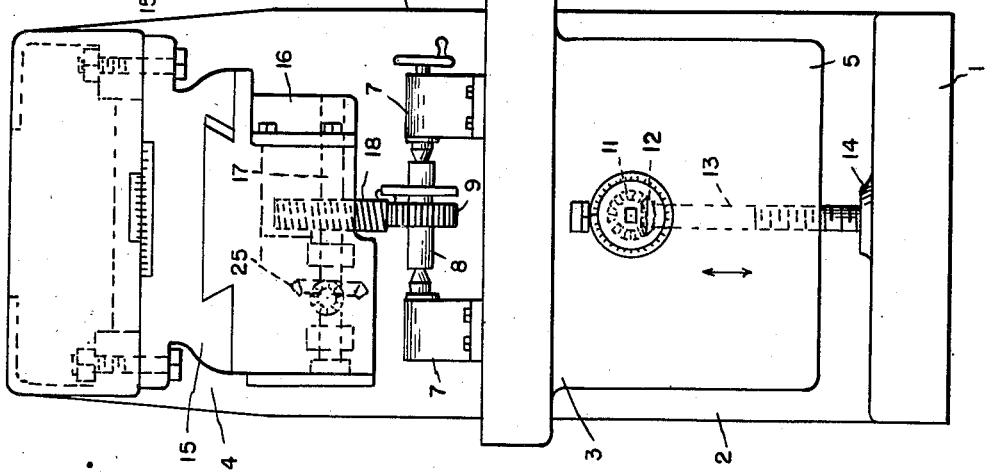
INVENTOR.
WALTER S. PRAEG
BY
Whittemore Hulbert & Belknap.
ATTORNEYS Patented June 19, 1951

2,557,462

UNITED STATES PATENT OFFICE 2,557,462

GEAR FINISHING

Walter S. Praeg, Detroit, Mich., assignor to National Broach & Machine Company, Detroit, Mich., a corporation of Michigan Application February 18, 1946, Serial No. 648,366

3 Claims. (Cl. 90—1.6)

The invention relates to the finishing of gear teeth and refers more particularly to the finishing of the teeth of a shoulder gear by shaving.

The invention has for some of its objects to provide both an improved method of and an improved machine for finishing the teeth of a shoulder gear by a cutter in a manner such that the teeth of the gear are finished without possibility of contact of the cutter with the shoulder of the gear thereby eliminating possibility of breakage of the cutter or damage to the machine by reason of such contact.

The invention has for another object to compensate for the amount of material to be removed from the gear teeth by relatively reciprocating the gear and cutter at different speeds and more particularly relatively moving the gear and cutter during the work stroke of the cutter at a speed which is lowered as the amount of material increases.

With these as well as other objects in view, the invention resides in the novel steps and features of construction and combinations and arrangements of parts as more fully hereinafter set forth.

In the drawings:

Figure 3 is a side elevation of a machine embodying the invention;

Figure 4 is a front elevation thereof;

Figure 1:
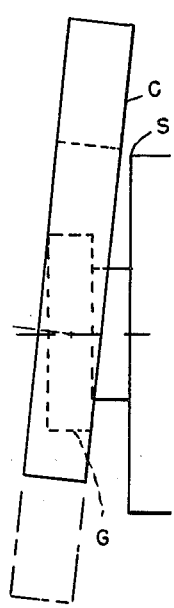
Figure 1 is a diagrammatic view illustrating the method of finishing the teeth of a shoulder gear in accordance with the invention.
Figure 2:
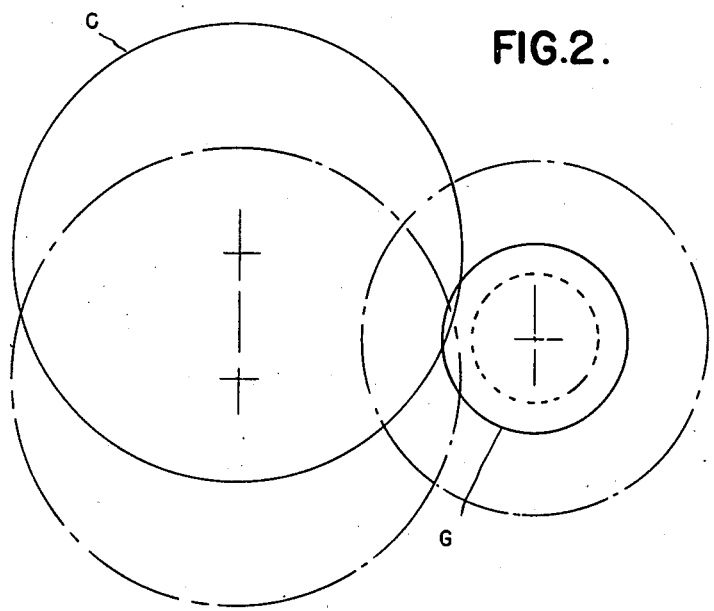
Figure 2 is a side elevation of Figure 1.

According to the present method as diagrammatically illustrated in Figures 1 and 2, the roughed-out shoulder gear G, the teeth of which are to be finished by shaving, is placed loosely in mesh in crossed axes relation with the circular gear-like cutter C with the cutter clearing the shoulder S of the gear and the axes of the gear and cutter in parallel planes spaced from each other a predetermined distance. The gear and cutter at this time are in the positions indicated by the full lines with the center of crossed axes beyond and at the shoulder side of the gear. With the gear and cutter in mesh both are rotated preferably by rotating the cutter and during the rotation the gear and cutter are relatively reciprocated, while maintaining their axes in their respective parallel planes, across each other at right angles to the axis of the cutter. This is accomplished by preferably reciprocating the cutter, as indicated by the arrow, to move the cutter through the complete cycle from the initial full line position to the dotted line position and then from the latter position to the former position. When the cutter is in the dotted line position the center of crossed axes is at the side of the gear opposite that of the center of crossed axes in the full line position. During the movement of the cutter from the full line position to the dotted line position, the teeth, which are formed in the usual manner with lateral cutting edges, advance toward the bottoms of the spaces between the teeth of the gear and at the same time the lateral cutting edges slide longitudinally of the teeth of the gear to shave the same, the movement being sufficient to distribute from end to end of the teeth of the gear the cutting action which takes place over a limited contact area by reason of the crossed axes relation of the gear and cutter. During this movement the work stroke of the cutter takes place and during the return movement the finish stroke of the cutter occurs. The speed of relative reciprocation is preferably controlled, it being predetermined substantially in accordance with the amount of material to be removed from the teeth of the gear, the speed being slower the greater the amount of material to be removed. Also the speed of the cutter is preferably predeterminedly controlled to take care of the various diameters of the gears and also the different types of material of which the gears are made.

With this method, it will be seen that by reason of the crossed axes relation of the gear and cutter cutting action takes place over a limited contact area. Also, by reason of relative reciprocation of the gear and cutter across each other and at right angles to the axis of the cutter between positions locating the center of crossed axes at the opposite sides of the gear, the cutting action is distributed from end to end of the teeth of the gear. Furthermore, by reason of the relative reciprocation of the gear and cutter across each other at right angles to the axis of the cutter, the cutter moves through a path within the confines of its sides so that there is no possibility of the cutter coming into contact with the shoulder of the gear. As a result, breakage of the cutter or possible damage to the machine for carrying out this method is avoided. It will also be seen that only one work stroke and only one finishing stroke are required to finish the teeth of the gear to size since the relative reciprocation of the gear and cutter takes place with the axes of these members in parallel planes spaced from each other a predetermined distance which predetermines the size or diameter of the gear.

Figure 5:
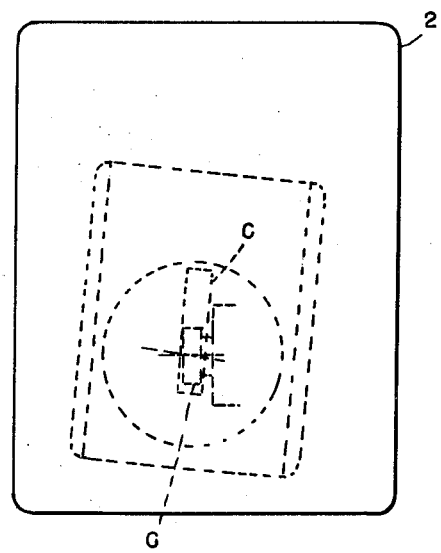
Fig. 5 is a diagrammatic view illustrating the operation of the machine.

The machine, as shown in Figures 3, 4 and 5, for carrying out the method comprises the base 1, the column 2, the supports 3 and 4 for the shoulder gear and the gear-like cutter respectively, and mechanism for rotating the gear and cutter while in mesh and also relatively reciprocating the gear and cutter to relatively move the same across each other through a cycle comprising one work stroke and one return finishing stroke.

The support 3 comprises the knee 5, the table 6 upon the knee and the tail and head stocks 7 upon the table and engaging the shaft 8 upon which the shoulder gear 9 is mounted. The knee is vertically slidable upon the column 2 and may be predeterminedly vertically adjusted for different sizes of shoulder gears by means of the shaft 10 having the bevel gear 11 in mesh with the bevel gear 12 upon the vertical screw 13 which is threaded into the nut 14 which rests upon the base 1.

The support 4 comprises the swivel saddle 15 which is suspended from an overhanging portion of the column 2 and is angularly adjustable about a vertical axis passing through the axis of the shoulder gear. The support also comprises the cutter head 16 in which is journaled the shaft 17 having fixedly secured thereto the circular gear-like cutter 18. This cutter head is suspended from the saddle 15 and is mounted therein to slide horizontally in a direction at right angles to the axes of the shaft 17 and cutter 18. The cutter is formed in the usual manner with gashes extending from the bottoms to the tips of the teeth substantially parallel to the median plane of the cutter and producing intermediate and end lands with lateral cutting edges at their corners.

The saddle 15 is angularly adjusted to position the cutter with its axis at an angle to the axis of the shoulder gear so that the cutter and gear are arranged in crossed axes relation and mesh at crossed axes. The adjustment is such that the cutter clears the shoulder of the shoulder gear.

The mechanism for rotating the cutter and thereby rotating the shoulder gear in mesh with the cutter comprises the electric motor 19, suitable change gearing in the housing 20 driven by the electric motor, the universal joint 21 driven by the change gearing, the universal joint 22 driven by the shaft 23 slidably engaging the universal joints and driving the shaft 24 having secured thereto a bevel pinion which meshes with the bevel gear 25 upon the shaft 17. The change gearing is manually changed to select a speed of rotation of the cutter suitable for the diameter of the gear and the type of material of which the gear is made.

The constructions of the supports for the gear and cutter are such that the axes of the gear and cutter are in parallel horizontal planes at a predetermined distance apart depending upon the desired size or diameter of the finished gear.

The mechanism for reciprocating the cutter at right angles to its axis and across the gear comprises the electric motor 26, suitable change gearing in the housing 27 driven by the electric motor, the universal joint 28 driven by the change gearing and the screw 29 driven by the universal joint 28 and having threaded engagement with the bracket 30 upon the cutter head. By reason of the change gearing the proper speed of reciprocation, especially during the work stroke, may be selected to compensate for the amount of material to be removed from the gear teeth, the change gearing being manually changed to decrease the speed of reciprocation as the amount of material to be removed increases.

As thus far described, it will be seen that a roughed-out shoulder gear may be inserted in backlash position with the cutter. At which time the cutter head, cutter and other parts are in the position shown in Figure 3, the gear loosely meshes with the cutter and the center of crossed axes is at the shoulder side of the gear. The mechanism for rotating the cutter is then started, as is also the mechanism for reciprocating the cutter head and cutter. It will be noted that when the latter mechanism is started the cutter head and cutter are moved horizontally in a direction at right angles to the axis of the cutter and the cutter is moved across the shoulder gear so that the teeth of the cutter in effect advance into the teeth or toward the bottoms of the spaces between the teeth of the gear and, at the same time, the lateral cutting edges on the teeth of the cutter slide longitudinally of the teeth of the gear to distribute the cutting action. This movement is continued until center of crossed axes is at the opposite side of the gear at which time the cutter may be said to have reached the end of its work stroke. The cutter head and cutter are then moved in the opposite direction to the starting point, during which the cutter is preferably rotated in the opposite direction. The return movement is the finishing stroke of the cutter, a greater portion of the shaving having been done by the cutter during its work stroke. The reciprocation of the cutter head and cutter is controlled by suitable means such as the limit switches 31 and 32 upon the saddle and the dog 33 upon the cutter head.

By reason of relative reciprocation of the cutter and shoulder gear being at right angles to the axis of the cutter, the cutter cannot come into contact with the shoulder of the shoulder gear, regardless of the length of stroke of the cutter head and cutter so that breakage of the cutter or damage to the machine are avoided.

What I claim as my invention is:

1. The method of finishing the teeth of a shoulder gear comprising meshing at crossed axes a shoulder gear and a circular gear-like cutter, rotating the gear and cutter in mesh, relatively moving the gear and cutter across each other at right angles to the axis of the cutter from a relative position in which the center of crossed axes is at one side of the gear to a relative position in which the center of crossed axes is at the other side of the gear, and then relatively moving the gear and cutter across each other at right angles to the axis of the cutter to the first mentioned relative position.

2. A machine for finishing the teeth of a shoulder gear comprising a support for a gear, a support for a circular gear-like cutter arranged to hold said cutter in mesh and at crossed axes with the gear, means for rotating the gear and cutter while in mesh, and means for relatively moving the gear and cutter across each other in opposite directions at right angles to the axis of the cutter with the axes of the gear and cutter in parallel planes spaced a predetermined distance apart.

3. The method of finishing the teeth of a shoulder gear which comprises initially meshing the gear with a rotary gear-like cutter with the axes of said gear and cutter crossed and with the projection of the sides of said cutter clearing the shoulder, rotating said gear and cutter in mesh, and relatively traversing said gear and cutter in a direction which occupies a plane parallel to the axes of both said gear and cutter, which direction in said plane is perpendicular to the axis of said cutter.

WALTER S. PRAEG.

REFERENCES CITED

The following references are of record in the file of this patent:

UNITED STATES PATENTS

| Number | Name | Date |
|---|---|---|
| 2,126,178 | Drummond | Aug. 9, 1938 |
| 2,245,654 | Drader et al. | June 17, 1941 |
| 2,335,215 | Schurr | Nov. 23, 1943 |
| 2,344,292 | Drader | Mar. 14, 1944 |
| 2,347,997 | Drummond | May 2, 1944 |
| 2,350,882 | Drummond | June 6, 1944 |
| 2,411,973 | Mentley | Dec. 3, 1946 |

FOREIGN PATENTS

| Number | Country | Date |
|---|---|---|
| 480,247 | Great Britain | Feb. 14, 1938 |